United States Patent [19]

Sakurai et al.

[11] Patent Number: 4,481,845
[45] Date of Patent: Nov. 13, 1984

[54] METHOD AND APPARATUS FOR CONTROLLING THE FEEDING OF A BANDSAW BLADE OF HORIZONTAL BANDSAW MACHINES

[75] Inventors: Nobuo Sakurai, Yokohama; Kikuo Moriya, Machida, both of Japan

[73] Assignee: Amada Company, Limited, Isehara, Japan

[21] Appl. No.: 404,522

[22] Filed: Aug. 2, 1982

Related U.S. Application Data

[62] Division of Ser. No. 154,108, May 28, 1980, Pat. No. 4,357,848.

[30] Foreign Application Priority Data

May 30, 1979 [JP] Japan .................................. 54-66061
May 30, 1979 [JP] Japan .................................. 54-66062

[51] Int. Cl.³ ............................................. B23D 53/04
[52] U.S. Cl. .................................... 83/13; 83/800; 83/801; 83/72; 83/56
[58] Field of Search ................. 83/800, 801, 72, 796, 83/13, 56

[56] References Cited

U.S. PATENT DOCUMENTS

| | | | |
|---|---|---|---|
| 3,715,946 | 2/1973 | Kaltenbach | 83/72 |
| 3,754,490 | 8/1973 | Sata et al. | 83/800 |
| 4,016,787 | 4/1977 | Sugimoto | 83/800 |
| 4,357,848 | 11/1982 | Sakurai et al. | 83/801 |

*Primary Examiner*—Donald R. Schran
*Attorney, Agent, or Firm*—Thompson, Birch Gauthier & Samuels

[57] ABSTRACT

A method for controlling the feeding of a band saw blade in a horizontal band saw machine so that the band saw blade is fed at a uniform optimum cutting rate. A control system is provided for controlling the feeding speed and the driving speed of the band saw blade in such a manner that the ratio of the feeding speed to the driving speed is kept constant during a cutting operation and the ratio of cutting resistance to driving speed is maintained constant to provide a constant cutting power.

4 Claims, 9 Drawing Figures

METHOD AND APPARATUS FOR CONTROLLING THE FEEDING OF A BANDSAW BLADE OF HORIZONTAL BANDSAW MACHINES

This application is a division, of application Ser. No. 154,108, filed 5/28/80, now U.S. Pat. No. 4,357,848.

BACKGROUND OF THE INVENTION

1. Field of the Invention

The present invention relates generally to horizontal bandsaw machines in which a saw head assembly carrying a bandsaw blade is lowered during a cutting operation in order to feed the bandsaw blade into an underlying material to be cut, and more particularly pertains to methods and apparatus for controlling the feeding of the bandsaw blade in horizontal bandsaw machines.

2. Description of the Prior Art

Horizontal bandsaw machines conventionally comprise a saw head assembly in which a flexible endless bandsaw blade is trained around a pair of wheels so that it may perform cutting operations when the wheels are driven. The saw head assembly is so arranged as to be raised and lowered in relation to an underlying base supporting the material to be cut. This movement can occur around a hinge pin or along a single or plural guide posts in response to operation of a driving means such as a hydraulic motor. Thus, in cutting operations, the saw head assembly is lowered from the raised position toward the base so as to feed the bandsaw blade travelling therein into the material to be cut which has been placed on the base. Also, in most prevailing horizontal bandsaw machines, the saw head assembly is so arranged as to be raised by a hydraulic motor of a cylinder type when the hydraulic fluid is supplied thereinto and to be lowered by its own gravity when the hydraulic fluid is drained from the hydraulic motor.

In such horizontal bandsaw machines, the bandsaw blade is adjustably fed into the material to be cut at a higher or lower driven speed and at larger or smaller feeding force depending upon the nature of the material. Generally, the bandsaw blade is fed at a higher speed and a smaller feeding force when cutting normal easy-to-cut materials which are generally soft and brittle, and is fed at a lower speed and a larger feeding force when cutting difficult-to-cut materials which are generally hard and tough.

It is important to feed the bandsaw blade into the material to be cut so that the cutting action is performed always at a certain stated or uniform optimum cutting rate which is defined as the area (square millimeter) of cut per unit or time. Since many materials such as round bars and shape steels vary in cross-sectional length as cutting progresses therethrough, it is necessary to feed the bandsaw blade in correlation with this varying cross-sectional length of the material being cut so as to enable the bandsaw blade to operate continuously at a stated optimum cutting rate. Of course, if the bandsaw blade is not fed at an optimum cutting rate, it will work too hard and will become worn prematurely or otherwise it will work inefficiently.

For the purpose of performing cutting operations at a stated cutting rate according to the cross-sectional length of the material being cut, the bandsaw blade is conventionally arranged to be fed with a stated load or feeding force under the so-called load control or pressure control. In order to maintain the load or feeding force under the load control, the pressure of the hydraulic motor for the saw head assembly is controlled while the saw head assembly is lowered to feed the bandsaw blade into the material to be cut. The load control is intended to maintain the cutting resistance constant so as to feed the bandsaw blade at a stated cutting rate, since the cutting rate is generally proportional to the cutting resistance. Thus, under the conventional load control, the feeding speed of the bandsaw blade is controlled as a function of the cross-sectional cut length of the material to be cut so as to keep the cutting resistance constant while the driven speed of the bandsaw blade is kept unchanged.

The conventional load control, however, is defective especially in that it is based on the premise that the cutting resistance per unit of feeding amount or feeding speed of the bandsaw blade which is defined as feeding speed/driven speed of the bandsaw blade, is always constant or uniform. In fact, the cutting resistance per unit of feeding amount of the bandsaw blade has a tendency to increase as the feeding amount decreases. Accordingly, when the feeding speed or amount is decreased in order to maintain the cutting resistance constant to respond to an increase of the cross-sectional length of the material being cut for instance, the cutting resistance per unit of feeding amount will have a tendency to further increase. The cutting resistance per unit of feeding amount will markedly increase, especially when cutting difficult-to-cut materials such as stainless steels which have to be cut at a low feeding speed or by a small feeding amount. Thus, the difficult-to-cut materials can not be cut at a uniform optimum cutting rate by the conventional load control in the horizontal machine, although the easy-to-cut materials which can be cut at a higher feeding speed namely by a larger feeding amount can be cut at a substantially uniform cutting rate under the conventional load control.

SUMMARY OF THE INVENTION

It is a primary object of the present invention to provide methods and apparatus for controlling the feeding of the bandsaw blade in horizontal bandsaw machines so that the bandsaw blade may be fed always at a uniform optimum cutting rate in correlation with the cross-sectional cut length of the material being cut regardless of the nature of the material.

It is another object of the present invention to provide methods and apparatus for controlling the feeding of the bandsaw blade in horizontal bandsaw machines whereby the cutting efficiency can be remarkably increased.

It is a further object of the present invention to provide methods and apparatus for controlling the feeding of the bandsaw blade in horizontal bandsaw machines whereby the life of the bandsaw blade can be remarkably lengthened.

Basically, these objects are accomplished by controlling the bandsaw blade so as to keep the feeding amount stated or constant by maintaining the ratio of the driven speed and the feeding speed of the bandsaw blade constant and also to keep the cutting power constant and the feeding amount constant.

Other and further objects and advantages of the present invention will be apparent from the following description and accompanying drawings which, by way of illustration, show preferred embodiments of the present invention and the principles thereof.

DESCRIPTION OF THE PREFERRED EMBODIMENTS

Figure 1:
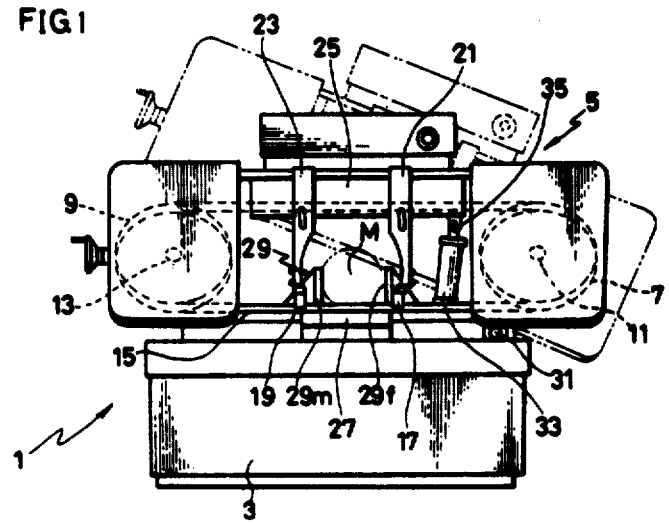
FIG. 1 is a front elevational view of a horizontal bandsaw machine in which the principles of the present invention can be embodied.

Referring now to FIG. 1, there is shown a horizontal bandsaw machine which is generally designated by the numeral 1 and comprises a box-like base 3 and a saw head assembly 5 which is movable toward and away from the base 3 as is conventional. The saw head assembly 5 includes a driving wheel 7 and a driven wheel 9 having shafts 11 and 13, respectively, around which an endless bandsaw blade 15 is trained so that it may be driven to make a cutting action when the driving wheel 7 is power driven. The bandsaw blade 15 is slidably held or guided with its cutting edge faced downwardly by a pair of guide assemblies 17 and 19 fixed to guide arms 21 and 23, respectively, which are adjustably held by a beam member 25 fixed at the upper portion of the saw head assembly 5. A work-table 27 is mounted on the base 3 so that a material M to be cut may be placed thereon, and a vise assembly 29 having a fixed jaw 29f and a movable jaw 29m is also mounted on the base 3 to hold the material M to be cut therebetween. Also, the saw head assembly 5 is pivotally connected to the base 3 by means of a hinge pin 31 and arranged to be raised and lowered relative to the base 3 by a hydraulic motor 33 of a cylinder type having a piston and rod 35. However, the saw head assembly 5 so arranged as to be vertically raised away from and lowered toward the base 3 along a vertical guide post or posts by a hydraulic motor or other means, as will be disclosed hereinafter. In any event, when the saw head assembly 5 is lowered from its raised position shown by the imaginary lines in FIG. 1, the bandsaw blade 15, which is rotating around the driving and driven wheels 7 and 9 in the saw head assembly 5, will be fed into the material M that is to be cut. The material M is held by the vise assembly 29 on the work-table 27.

Figure 2:
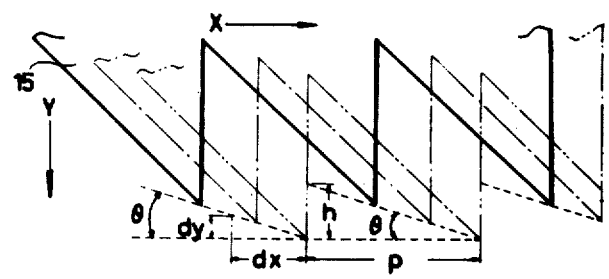
FIG. 2 is an illustration regarding the feeding of the bandsaw blade used in the horizontal bandsaw machine shown in FIG. 1.

Referring to FIG. 2, the feeding of the bandsaw blade 15 will be theoretically and mathematically examined with respect to the cutting resistance, the feeding and driven speeds and the feeding amount of the bandsaw blade and the cutting rate. In FIG. 2, the bandsaw blade 15 with a distance between teeth (teeth distance) p is shown as being driven along the X-axis as shown by the arrow and fed along the Y-axis as shown by the arrow and also cutting into the material M to be cut at a cutting angle of $\theta$ by a feeding amount h as shown by the imaginary lines. Thus, firstly, the following equation can be given:

$$\tan \theta = \frac{dy}{dx} = \frac{h}{p} \tag{1}$$

By transforming the equation (1), the feeding amount h per teeth can be obtained as follows:

$$h = p \cdot \frac{dy}{dx} = p \cdot \frac{dy}{dt} \cdot \frac{dt}{dx} = p \cdot \frac{dy}{dt} \cdot \frac{1}{\frac{dx}{dt}} \tag{2}$$

Thus, $$\text{Feeding Amount } (h) = \frac{\text{Teeth Distance } (p) \times \text{Feeding Speed } (Vf)}{\text{Blade Driven Speed } (Vt)} \tag{3}$$

Also, the cutting resistance (r) per teeth is expressed as $$\text{Cutting Resistance } (r) = A \times \text{Feeding Amount } (h) \tag{4}$$

where A is a constant which is to be experimentally obtained. Therefore, the cutting resistance of the whole teeth is expressed as $$\text{Cutting Resistance of the Whole Teeth } (R) = \text{Cutting Resistance } (r) \text{ per Teeth} \times \text{Number of Teeth } (n) \tag{5}$$

By substituting the equation (4) for the equation (5), one obtains $$\text{Cutting resistance } (R) = \text{Constant } (A) \times \text{Feeding Amount } (h) \times \text{Number of Teeth } (n) \tag{6}$$

Also, the cross-sectional cut length (L) of the material M being cut can be expressed as follows:

$$\text{Cross-sectional Cut Length } (L) = \text{Teeth Distance } (p) \times \text{Number of Teeth } (n) \tag{7}$$

namely, $$\text{Number of Teeth } (n) = \frac{\text{Cross-sectional Cut Length } (L)}{\text{Teeth Distance } (p)} \tag{8}$$

By substituting the equation (8) for the equation (6), the cutting resistance (R) is obtained as follows:

$$\text{Cutting Resistance } (R) \tag{9}$$

$$= A \times \frac{\text{Feeding Amount } (h) \times \text{Cross-sectional Cut Length } (L)}{\text{Teeth Distance } (p)}$$

Also, by substituting the equation (3) for the equation (9), the cutting resistance (R) can be obtained as follows:

$$\text{Cutting Resistance } (R) \tag{10}$$

$$= A \times \frac{\text{Teeth Distance } (p) \times \text{Feeding Speed } (Vf)}{\text{Blade Driven Speed } (Vt)} \times \frac{\text{Cross-sectional Cut Length } (L)}{\text{Teeth Distance } (p)}$$

$$\text{Cutting Resistance } (R)$$

$$= A \times \frac{\text{Feeding Speed } (Vf) \times \text{Cross-sectional Cut Length } (L)}{\text{Blade Driven Speed } (Vt)}$$

$$\text{Cutting Resistance } (R) \times \text{Blade Driven Speed } (Vt) = A \times \text{Feeding Speed } (Vf) \times \text{Cross-sectional Cut Length } (L) \tag{11}$$

The cutting rate ($\eta$) of the horizontal bandsaw machines is defined as follows:

$$\text{Cutting Rate } (\eta) = \frac{\text{Cut Area } (S)}{\text{Time } (T)} \quad (12)$$

By using the equation (11) again, the following expressions can be obtained:

Cutting Resistance $(R) \times$ Blade Driven Speed
$(Vt) = A \times$ Feeding Speed $(Vf) \times$ Cross-sectional
Cut Length $(L)$                                (11)

Cutting Resistance $(R) \times$ Blade Driven Speed $(Vt)$    (11)

$= A \times$ Feeding Speed $(Vf) \times$ Cross-sectional Cut Length $(L)$ (13)

$= A \times \dfrac{\text{Feeding Amount } (h)}{\text{Time } (T)} \times$ Cross-sectional Cut Length $(L)$ $= A \times$ Cutting Rate $(\eta)$ The cutting power (H) is expressed as follows:

Cutting Resistance $(R) \times$ Blade Driven Speed
$(Vt) =$ Cutting Power $(H)$                                    (14)

By substituting the equation (14) for the equation (13), the following equation can be obtained:

Cutting Power $(H)$                                           (15)
$=$ Cutting Resistance $(R) \times$ Blade Driven Speed $(Vt)$ $= A \times$ Cutting Rate $(\eta)$ From the above description, it will be understood that the cutting rate ($\eta$) can be maintained constant or uniform if the cutting power (H) is maintained constant as shown in the equation (15). According to the present invention, the cutting power (H) is maintained stated so as to maintain the cutting rate stated or uniform ($\eta$) according to the equation (15) and also the ratio of the blade driven speed (Vt) and the feeding speed constant so as to maintain the feeding amount (h) stated in the equation (3). Thus, when the cutting resistance (R) is increased because of the increase of the cross-sectional cut length (L) of the material M being cut, the feeding speed (Vf) is dropped and simultaneously the blade driven speed (Vt) is also dropped at a fixed ratio to the feeding speed (Vf) so as to maintain the cutting power (H) = the cutting resistance (R) × the blade driven speed (Vt) of equation (14) constant. This can be satisfactorily done as long as the teeth distance (p) × the feeding speed (Vf)/the blade driven speed (Vt) = the feeding amount (h) of the equation (3) is maintained constant.

The trouble is, however, that the feeding amount (h) does not remain constant, but it increases because of some errors or for other reasons when the blade driven speed (Vt), for instance, is dropped. Accordingly, when the cutting resistance (R) is increased because of the increase of the cross-sectional cut length (L) of the material M being cut and the blade driven speed (Vt) is dropped so as to keep the cutting power (H) constant, the feeding amount (h) would increase to cause the cutting resistance to further increase. Thus, if the feeding amount (h) is increased when the blade driven speed (Vt) is dropped to decrease the cutting resistance (R) in order to keep the cutting power (H) constant, the cutting resistance (R) will contrarily increase further to make it necessary to drop the blade driven speed (Vt) again.

Figure 3A:
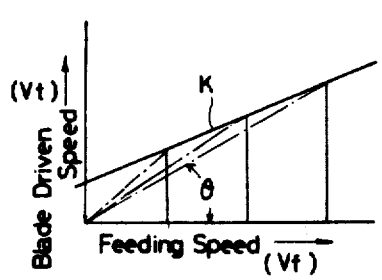
FIGS. 3a and 3b are graphs each showing a function.
Figure 3B:
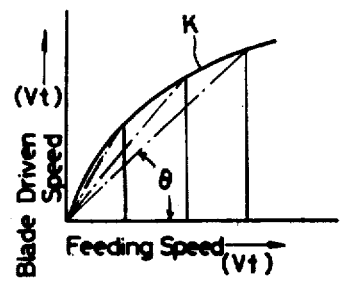

Referring to FIGS. 3a and 3b which are graphs, in order to decrease the feeding amount (h) according to the reduction of the blade driven speed (Vt), a gang control function (K) of the feeding speed (Vf) and the blade driven speed (Vt) is set up according to the present invention. In the graphs of FIGS. 3a and 3b, the feeding speed (Vf) and the blade speed (Vt) are shown in the X and Y axes, respectively, and the gang control function (K) is shown as a straight line and a curve in FIGS. 3a and 3b, respectively. Thus, the following equation is expressed:

$$\text{Feeding Amount } (h) = \frac{\text{Feeding Speed } (Vf)}{\text{Blade Driven Speed } (Vt)} = \cot \theta \quad (16)$$

Accordingly, when the feeding speed (Vf)/(blade driven speed (Vt)) is increased, $\theta$ will decrease and the feeding amount (h) will increase. Also, when the feeding speed (Vf)/(blade driven speed (Vt)) is decreased, $\theta$ will increase and the feeding amount (h) will decrease. Thus, the variation of the feeding amount (h) can be minimized by controlling the relation of the blade driven speed (Vt) and the feeding speed (Vf), although the feeding amount (h) can be not completely kept constant.

The equation of the straight line of the gang control function (K) of FIG. 3a, for example, is expressed as Blade Driven Speed $(Vt) = D \times$ Feeding Speed
$(Vf) + E$                                                   (17)

where D and E are constants which are to be experimentally obtained. Also, the blade driven speed (Vt) can be expressed as Blade Driven Speed $(Vt) = f($Feeding Speed $(Vf))$    (18)

where f is a function showing the relation of the blade driven speed (Vt) and the feeding speed (Vf). By substituting the equation (18) for the equation (13), the following equations can be obtained:

Cutting Resistance $(R) \times f($Feeding Speed
$(Vf)) = A \times$ Cutting Rate $(\eta)$                             (19)

$$f(\text{Feeding Speed } (Vf)) = \frac{A \times \text{Cutting Rate } (\eta)}{\text{Cutting Resistance } (R)} \quad (20)$$

$$\text{Feeding Speed } (Vf) = f^{-1}\left(\frac{A \times \text{Cutting Rate } (\eta)}{\text{Cutting Resistance } (R)}\right) \quad (21)$$

Figure 4:
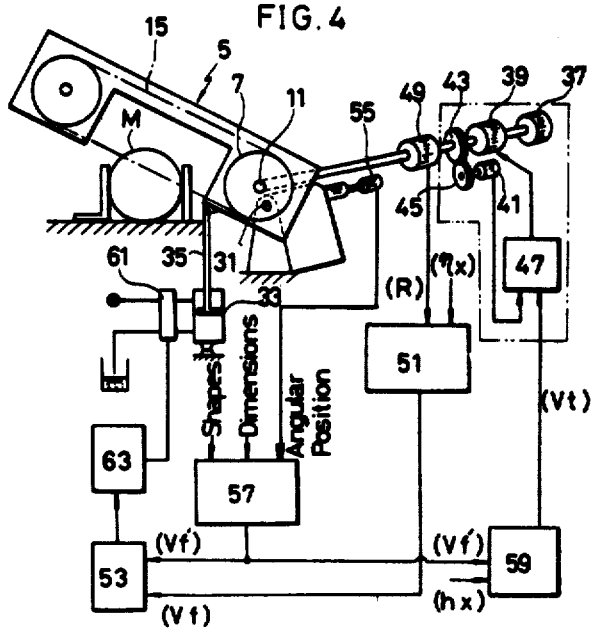
FIGS. 4, 5, 6, 7 and 8 are diagrammatic views of the control systems of horizontal bandsaw machines such as shown in FIG. 1 embodying the principles of the present invention.

Referring to FIG. 4, the first embodiment of the principle of the present invention will be described about the same horizontal bandsaw machine 1 as shown in FIG. 1 in which the saw head assembly 5 is raised and lowered around the hinge pin 31 by the hydraulic motor or cylinder 33.

In this embodiment, the driving wheel 7 is driven by a motor 37 through a speed change unit 39, and a tachometer generator 41 is connected to the motor 37 and the driving wheel 7 and the speed change unit 39 through transmitting means such as gears 43 and 45. The tachometer generator 41 is connected to a blade speed controlling unit 47 which generates feedback signals for controlling speed change unit 39. Also, a torque detector 49 is provided between the tachometer generator 41 and the driving wheel 7, and it is connected to a feeding speed computing unit 51 to give signals to the same. The feeding speed computing unit 51 is so arranged as to obtain the feeding speed (Vf) of the bandsaw blade 15 according to the signals given by the torque detector 49 and based upon the equation (21) which has been described hereinbefore. Also, the feeding speed computing unit 51 is connected to a comparator 53 so as to give it the feeding speed (Vf) obtained.

An angle detector 55 such as an encoder for detecting the lowering angle or angular position of the saw head assembly 5 is connected to the hinge pin 31, and it is also connected to an actual feeding speed computing unit 57. The angle detector 55 is so arranged as to give to the actual feeding speed computing unit 57 signals about the angular position of the saw head assembly 5 during cutting operations. The actual feeding speed computing unit 57 is so arranged as to be stored with shapes and dimensions of materials to be cut and types and dimensions of the horizontal bandsaw machine 1 and obtain the actual feeding speed (Vf') of the bandsaw blade 15 according to the signals given by the angle detector 55 and based upon the stored information. Also, the actual feeding speed computing unit 57 is connected to the comparator 53 and a blade speed computing unit 59 so as to give them the actual feeding speed (Vf') obtained.

The comparator 53 is so arranged as to compare the feeding speed (Vf) given by the feeding speed computing unit 51 and the actual feeding speed (Vf') and control a servovalve 61 through a servovalve controlling unit 63 according to the difference between the two feeding speeds (Vf) and (Vf'). Also, the servovalve 61 is so arranged as to control the hydraulic motor 33 for raising and lowering the saw head assembly 5 in order to control the feeding speed (Vf) of the bandsaw blade 15.

The blade speed computing unit 59 is connected to the blade speed controlling unit 47, and it is so arranged as to obtain the optimum blade driven speed (Vt) according to a given desired feeding amount (hx) and the actual feeding speed (Vf') and based upon the equations (16) and (18) described hereinbefore and give the obtained blade driven speed (Vt) to the blade speed controlling unit 47.

In order to control the feeding speed (Vf) and the driven speed (Vt) of the bandsaw blade 15 in the first embodiment shown in FIG. 1, firstly the transmitting torque of the driving wheel 7 that is the rotary driving force is taken as the cutting resistance (R) by the torque detector 49 and is given to the feeding speed computing unit 51. Then, the feeding speed (Vf) is obtained by the feeding speed computing unit 51 based upon the equation (21) namely $Vf = f^{-1}(A \cdot \eta/R)$ accordng to the cutting resistance (R) given by the torque detector 49 and the stored desired cutting rate ($\eta \times$) and it is transmitted to the comparator 53. Also, the angular position of the saw head assembly 5 is transmitted by the angle detector 55 to the actual feeding speed computing unit 57. Thus, the actual feeding speed (Vf') is obtained by the actual feeding speed computing unit 57 according to the angular position of the saw head assembly 5 given by the angle detector 55 and the shape and dimension of the material M to be cut and the type and dimension of the horizontal bandsaw machine. Then, the actual feeding speed (Vf') is transmitted to the comparator 53 and the blade speed computing unit 59.

Thereafter, the comparator 53 compares the two feeding speeds (Vf) and (Vf') and controls the hydraulic motor 33 through the servovalve controlling unit 63 and the servovalve 61 so as to make the two feeding speeds (Vf) and (Vf') approximate equal to each other to control the feeding speed (Vf) of the bandsaw blade 15. On the other hand, the blade speed computing unit 59 obtains the driven speed (Vt) of the bandsaw blade 15 based upon the equations (16) and (18) and according to the actual feeding speed (Vf') given by the actual feeding speed computing unit 57 and the desired feeding amount (hx). The blade driven speed (Vt) obtained by the blade speed computing unit 59 is given to the blade speed controlling unit 47 so as to enable the same to control the driven speed (Vt) through the speed change unit 39.

Figure 5:
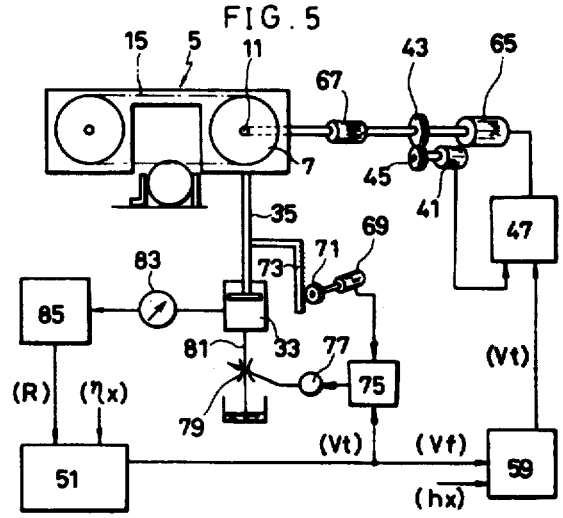

Referring to FIG. 5, descriptions will be made about the second embodiment in which the saw head assembly 5 is so disposed as to be raised and lowered by the hydraulic cylinder 33 vertically along a guide post or posts which are not shown but are to be vertically disposed. Since this second embodiment is of course similar in principle to the first embodiment shown in FIG. 4, elements common to both the embodiments will be described by use of common reference numerals.

In the second embodiment, the driving wheel 7 for driving the bandsaw blade 15 is shown as driven by a servomotor 65 through a reduction gear unit 67. The servomotor 65 has functions of both of the motor 37 and the speed change unit 39 used in the first embodiment shown in FIG. 4 although it needs the reduction gear unit 67, and therefore, the motor 37 and the speed change unit 39 in the first embodiment can be used for the servomotor 65 and the reduction gear unit 67. The servomotor 65 is so arranged as to be controlled by the blade speed controlling unit 47 to control the driven speed (Vt) of the bandsaw blade 15 in the same manner as the speed change unit 39 in the first embodiment. Also, in all the same manner as the first embodiment, a tachometer generator 41, connected to the shaft of the servomotor 65 through transmitting means such as gear 43 and 45, is connected to the blade speed controlling unit 47, and a blade speed computing unit 59 is also to the same. Thus, the driven speed (Vt) of the bandsaw blade 15 is controlled by the blade speed controlling unit 47 and the blade speed computing unit 59 in the same manner as the first embodiment.

In order to detect the lowering speed of the saw head assembly 5 or the feeding speed of the bandsaw blade 15, there is provided a tachometer generator 69 having a gear or pinion 71 which is disposed in engagement with a rack 73 secured to the saw head assembly 5. The rack 73 is vertically disposed in parallel with the guide post or posts for the saw head assembly 5, and it is shown in FIG. 5 as connected to the piston and rod 35 of the hydraulic motor 33. The tachometer generator 69 is connected to a feeding speed controlling unit 75 which is so arranged as to control through a driving means such as a motor 77 a flow control valve 79 which is provided in a drain passage 81 of the hydraulic motor 33 to control the feeding speed of the bandsaw blade 15. In this connection, the saw head assembly 5 is lowered when the hydraulic fluid is drained from the hydraulic motor 33 as is well-known, and the flow control valve 79 is so designed as to control the draining flow of the hydraulic fluid to control the lowering speed of the saw head assembly 5 that is the feeding speed of the bandsaw blade 15.

A pressure detector 83 is connected to the hydraulic motor 33 for the saw head assembly 33 to detect the hydraulic pressure therewithin, and it is connected to a cutting resistance computing unit 85 to transmit the pressure of the hydraulic motor 33 to same. The cutting resistance computing unit 85 is so arranged as to obtain or compute the cutting resistance (R) based upon an equation $R = W - A \cdot P$ where "W" is the weight of the saw head assembly 5, "P" is the pressure within the hydraulic motor 33, "A" is the working area of the piston and rod 35 of the hydraulic motor 33 and "R" is the vertical cutting resistance. Also, the cutting resistance computing unit 85 is connected to a feeding speed computing unit 51 so as to transmit the pressure of the hydraulic motor 33 to the same. The feeding speed computing unit 51 is so arranged as to obtain the feeding speed (Vf) according to the cutting resistance (R) given by the cutting resistance computing unit 85 and the desired cutting rate ($\eta \times$) and based upon the equation (21) $(Vf = f^{-1}(A \cdot \eta / R))$ and give the obtained feeding speed (Vf) to the blade speed computing unit 59 and the feeding speed controlling unit 75.

In order to control the feeding speed (Vf) and the driven speed (Vt) of the bandsaw blade 15 in the second embodiment, firstly the cutting resistance (R) is obtained by the cutting resistance computing unit 85 according to the hydraulic pressure given by the pressure detector 83 and based upon the equation $R = W - A \cdot P$ described above. Then, the feeding speed (Vf) is obtained by the feeding speed computing unit 51 according to the cutting resistance (R) given by the cutting resistance computing unit 85 and the desired cutting rate ($\eta \times$) and based upon the equation (21) $(Vf = f^{-1}(A \cdot \eta \times / R))$. The feeding speed (Vf) obtained by the feeding speed computing unit 51 is transmitted to the feeding speed controlling unit 75 and the blade speed computing unit 59. Thus, the feeding speed controlling unit 75 will control the hydraulic fluid draining from the hydraulic motor 33 by means of the motor 77 and the flow control valve 79 so as to control the lower of the saw head assembly 5 or the feeding speed (Vf) of the bandsaw blade 15. On the other hand, the blade speed computing unit 59 will obtain the blade driven speed (Vt) according to the feeding speed (Vf) given by the feeding speed computing unit 51 and the desired feeding amount (hx) and based upon the equations (16) ($h = Vf/Vt = \cot \theta$) and (18) (Vt = f(feeding speed)) to give the same to the blade speed controlling unit 47. Thus, the blade speed controlling unit 47 will control the servomotor 65 according to the blade driven speed (Vt) given by the blade speed computing unit 59 to control the driven speed (Vt) of the bandsaw blade 15. Also, the blade driven speed (Vt) and the feeding speed (Vf) are fed back for feedback control of the blade speed controlling unit 47 and the feeding speed controlling unit 75, respectively, by means of the tachometer generators 41 and 69, respectively.

Figure 6:
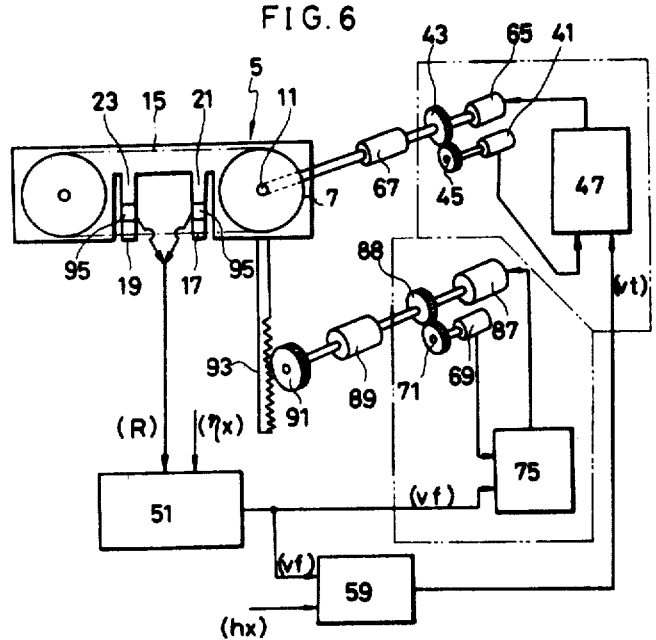

Referring to FIG. 6, descriptions will be made about the third embodiment in which the cutting head assembly 5 is so constructed to be vertically raised by means other than the hydraulic motor 23 used in the first and second embodiments. Since this third embodiment is very similar to the second embodiment shown in FIG. 5 in construction and function, elements common to the second embodiment will be given the same reference numerals and will not be described in detail.

In the third embodiment, the saw head assembly 5 is so designed as to be vertically raised and lowered by a servomotor 87 through a reduction unit 89 and by means of a pinion 91 and a rack 93. The rack 93 is vertically secured to the saw head assembly 5 so as to be vertically moved therewith, and the pinion 91 is disposed in engagement with the rack 93 so that it may raise and lower the rack 93 and the saw head assembly 5 when driven by the servomotor 87. There is provided a gear 88 between the servomotor 87 and the reduction unit 89, and a tachometer generator 69 having a gear 71 and being of the same nature as that used in the second embodiment is so disposed that its gear 71 is in engagement with the gear 88. The tachometer generator 69 is so arranged as to sense the lowering speed of the saw head assembly 5 or the feeding force of the bandsaw blade 15 and it is connected to a feeding speed controlling unit 75 to give the feeding speed to the same. Also, the feeding speed controlling unit 75 is connected to the servomotor 87 so as to control the same to control the lower speed of the saw head assembly 5 namely feeding speed of the bandsaw blade 15 by means of the pinion 91 and the rack 93.

In order to detect the vertical cutting resistance (R), load detecting means 95 such as pressure elements are disposed between the guide assemblies 17 and 19 in such a manner as to detect the cutting resistance or reaction urged to the back of the bandsaw blade 15 during cutting operations. The load detecting means 95 is so arranged as to transmit the cutting resistance (R) to a feeding speed computing unit 51 which is so arranged as to generate the feeding speed (Vf) according to the cutting resistance R given by the load detecting means 95 and the desired cutting rate ($\eta \times$) and based upon the equation (21) $(Vf = f^{-1}(A \cdot \eta / R))$. Also, in order to transmit the feeding speed (Vf), the feeding speed computing unit 51 is connected to the feeding speed controlling unit 75 and a blade speed computing unit 59 which is arranged in all the same manner as that in the second embodiment.

From the above description, it will be now understood that the feeding speed (Vf) of the bandsaw blade 15 is controlled by the feeding speed controlling unit 75 according to the feeding speed (Vf) given by the feeding speed computing unit 51 by means of the servomotor 87 for raising and lowering the saw head assembly 5. Also, it will be readily apparent that the driven speed (Vt) of the bandsaw blade 15 is controlled according to the blade driven speed (Vt) obtained by the blade speed computing unit 59 in all the same manner as that in the second embodiment.

Figure 7:
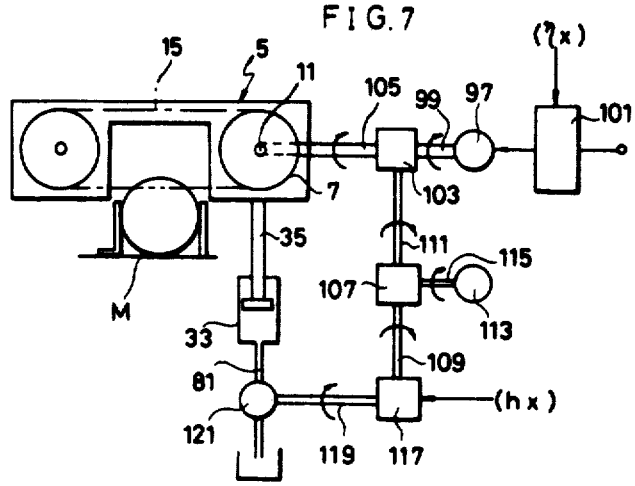

In the fourth embodiment shown in FIG. 7, a motor 97 having an output shaft 99 for driving the bandsaw blade 15 is so arranged as to be controlled by a power controlling unit 101 to keep the cutting rate ($\eta$) constant or uniform based upon the above described principle. As seen from FIG. 7, the motor 97 is connected to the shaft 11 of the driving wheel 7 for driving the bandsaw blade 15 by means of a coupling means 103 and a connecting shaft 105.

There is provided a differential gear unit 107 which has an output shaft 109 and is connected to the coupling means 103 by a connecting shaft 111, and a constant speed motor 113 is connected to the differential gear unit 107 by its output shaft 115. The output shaft 109 of the differential gear unit 107 is connected to a speed change unit 117 having an output shaft 119 which is connected to a metering valve 121 provided in the draining passage 81 of the hydraulic motor 33 for raising and lowering the saw head assembly 5. The metering valve 121 exhausts the hydraulic fluid from the hydraulic motor 33 according to its revolutions per unit of time and the stroking lengths of its plunger in the well-known manner.

When the motor 97 for driving the bandsaw blade 15 is controlled by the power controlling unit 101 according to the desired cutting rate ($\eta$), the rotations per unit of time of the output shaft 109 of the differential gear unit 107 is expressed as $N_1 - N_2$ where "$N_1$" is the revolutions per unit of time of the output shaft 99 of the motor 97 and "$N_2$" is the revolutions per unit of time of the constant speed motor 113. Also when the speed change unit 117 is set to a change gear ratio (G) according to the feed amount (hx), the rotations "$N_1 - N_2$" (per unit of time) of the output shaft 109 is changed to rotations $(N_1 - N_2) \cdot G$. Thus, in order to control the feeding speed (Vf) of the bandsaw blade 15, the hydraulic fluid drained from the hydraulic motor 33 in order to lower the saw head assembly 5 is controlled by the metering valve 121 which is rotated at the revolutions $(N_1 - N_2)G$ set by the speed change unit 117. As is readily apparent, the feeding speed (Vf) of the bandsaw blade 15 is controlled based upon the equation (17) $(Vt = D \times Vf + E)$, and it is expressed as $Vf = (Vt - E)/D$. In this connection, in order to adjust the feeding amount (h), it is possible to change the displacement of the metering valve 121 instead of changing the change gear ratio (G) of the speed change unit 117.

Figure 8:
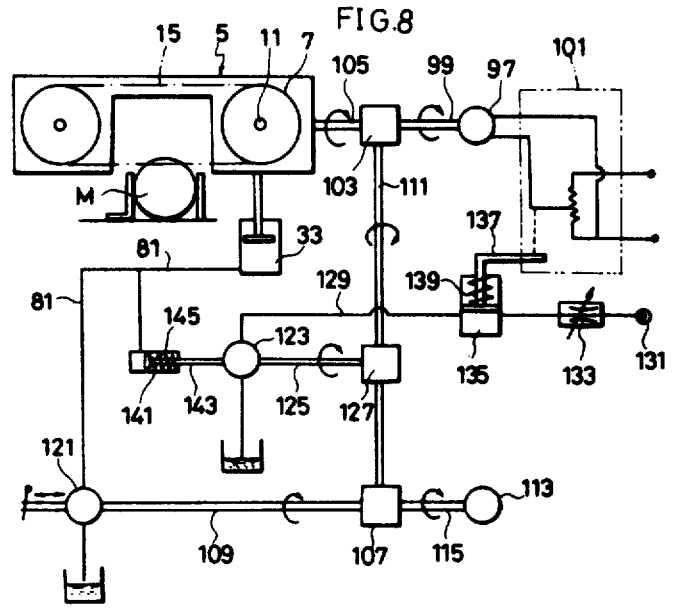

Referring to FIG. 8, descriptions will be made about the fifth embodiment which is similar to the fourth embodiment shown in FIG. 7. Elements in the fifth embodiment which are common to the fourth embodiment will be given the same reference numerals and will not be described in detail.

In the fifth embodiment, a motor 97 having a output shaft 99 and a power controlling unit 101 is connected to the shaft 11 of the driving wheel 7 by means of a coupling means 103 and a connecting means 105 in the same manner as the fourth embodiment. Also, a differential gear unit 107 having an output shaft 109 and connected with a constant speed motor 113 having an ouput shaft 115 is connected to the coupling means 103 by a connecting shaft 111 in the same manner as the fourth embodiment.

The differential gear unit 107, however, is directly connected to a metering valve 121 which is provided in the drain passage 81 of the hydraulic motor 33 to work in the same manner as in the fourth embodiment. Also, there is another metering valve 123 which is connected by a connecting shaft 125 to another coupling means 127 which is provided on the connecting shaft 111 between the coupling means 103 and the differential gear unit 107.

The metering valve 123 is connected by a passage 129 to a hydraulic source 121 through a flow control valve 133 of a pressure compensating type for setting the cutting rate, and there is provided between the flow control valve 133 and the metering valve 123 a hydraulic motor 135 having a piston and rod 137 biased by a spring 139 against the hydraulic pressure in the passage 129. The piston and rod 137 of the hydraulic motor 135 is connected to the power controlling unit 101 for controlling the voltage applied to the motor 97 as a function of the hydraulic pressure in the passage 129. Also, the metering valve 123 is controlled by a hydraulic motor 141 which is provided in the draining passage 81 of the hydraulic motor 33 and has a piston and rod 143 biased by a spring 145 against the hydraulic pressure in the draining passage 81 and connected to the plunger of the metering valve 123. Thus, the metering valve 123 will allow the hydraulic fluid to flow therethrough from the hydraulic source 131 to the hydraulic tank in inverse proportion to the hydraulic pressure in the drain passage 81 so as to control the output voltage of the power controlling unit 101 by means of the piston and rod 137 of the hydraulic motor 135 according to the hydraulic pressure in the drain passage 81.

Although a preferred form of the present invention has been illustrated and described, it should be understood that the device is capable of modification by one skilled in the art without departing from the principles of the invention. Accordingly, the scope of the invention is to be limited only by the claims appended hereto.

We claim:

1. A method for controlling the feeding of the bandsaw blade of horizontal bandsaw machines comprising the steps of generating feeding signals for feeding the bandsaw into a material to be cut, generating driving signals for driving the bandsaw blade, detecting the cutting resistance of the material to be cut, controlling the driving speed of said bandsaw in response to said driving signals to provide a constant ratio of cutting resistance to driving speed and to provide a constant cutting power, and controlling the feeding of said bandsaw in response to said feeding signals to provide a constant ratio of feeding speed to blade driving speed during the cutting operation of the material to be cut and to provide a constant cutting rate.

2. A method for controlling the feeding of the bandsaw blade of horizontal bandsaw machines comprising the steps of generating feeding signals for feeding the bandsaw blade into a material to be cut, generating driving signals for driving the bandsaw blade, detecting the cutting resistance of the material to be cut, controlling the driving speed of said bandsaw in response to said driving signals to provide a constant cutting power by maintaining a constant ratio of cutting resistance to driving speed, and controlling the feeding speed of said bandsaw in response to said feeding signals to maintain a constant cutting rate.

3. A method of controlling the feeding of a bandsaw blade of a horizontal bandsaw machine in order to maintain a constant cutting rate comprising the steps of:
   generating feeding signals for feeding the bandsaw blade into the material to be cut;
   generating driving signals for driving the bandsaw blade;
   detecting the resistance of the material to be cut;
   controlling the driving speed of said bandsaw in response to said driving signals to provide a constant ratio of cutting resistance to driving speed ratio, said constant ratio of cutting resistance to driving speed selected to provide a constant cutting power; and
   controlling the feeding speed in response to said feeding signals to provide a specific feeding speed to driving speed ratio, said specific feeding speed to driving speed ratio providing a constant cutting rate during the cutting operation.

4. A method of controlling the feeding of a bandsaw blade of a horizontal bandsaw machine to maintain a constant cutting rate comprising the steps of:
   detecting the cutting resistance of a material being cut;

generating feed signals representing a feeding speed of the bandsaw blade into a material to be cut, the feeding speed related to said detected cutting resistance;

generating drive signals for and controlling the driving speed of said bandsaw blade, the ratio of cutting resistance to driving speed being maintained constant to provide a constant cutting power, said drive signals being related to the ratio of feeding speed to driving speed; and controlling the feeding speed of said bandsaw in response to said feed signals in order to maintain a specific feeding speed to driving speed ratio to provide a constant cutting rate.

* * * * *